United States Patent [19]
Foltuz et al.

[11] Patent Number: 5,595,771
[45] Date of Patent: Jan. 21, 1997

[54] MODULAR MOLD FOR INJECTION MOLDING AND METHOD OF USE THEREOF

[76] Inventors: Eugene L. Foltuz; Norman H. Cohan, both of 14427 NW. 60th Ave., Miami Lakes, Fla. 33014

[21] Appl. No.: 334,060

[22] Filed: Nov. 4, 1994

[51] Int. Cl.⁶ .................................................. B29C 45/04
[52] U.S. Cl. .................. 425/443; 425/577; 425/DIG. 58; 264/318
[58] Field of Search ................................. 425/438, 441, 425/443, 577, DIG. 58; 264/318

[56] References Cited

U.S. PATENT DOCUMENTS

| | | |
|---|---|---|
| 3,932,085 | 1/1976 | Horbach . |
| 4,500,274 | 2/1985 | Cryiax et al. . |
| 4,795,125 | 1/1989 | Boros et al. ............................... 249/78 |
| 5,114,330 | 5/1992 | Nielson . |

OTHER PUBLICATIONS

Master Unit Frames and Interchangeable Quick Change Inserts, Master Unit Die Product, Inc., pp. 102–108, Date Unknown.

Master Unit Frames and Interchangeable Quick Change Inserts, Master Unit Die Products, Incorporated, 866 Fairplains Street, Greenville, Michigan 48838, pp. 102–108, date unknown.

"Modular" Technology, Advance Mold & Manufacturing, Inc., 508 Burnham Street South Windsor, CT 06074, 1993.

Primary Examiner—David W. Wu
Attorney, Agent, or Firm—Lott & Friedland

[57] ABSTRACT

A modular mold assembly for use in injection molding and method of use. The modular mold assembly comprises a fixed side and an ejector side and a plurality of interchangeable modules for shaping a plurality of sides of a component attached to the mold assembly. The modules include blank modules and slide modules. The interchangeable modules are attached to the mold assembly by slide retainers attached along an interior surface of the ejector side. Slide actuators are attached to the fixed side for engaging the slide modules. The slide actuators move the slide modules inward when the mold halves are pressed together forming a mold cavity and move the slide modules outward when the mold halves are separated.

12 Claims, 7 Drawing Sheets

MODULAR MOLD FOR INJECTION MOLDING AND METHOD OF USE THEREOF

TECHNICAL FIELD

This invention relates generally to a universal modular mold assembly for injection molding machines and, more specifically, this invention relates to a universal modular mold assembly for injection molding machines which includes removable slide modules to customize the shape of the mold assembly to meet the specific configuration of various mold inserts.

BACKGROUND OF THE INVENTION

In the plastic injection molding industry, the rising costs of labor and materials coupled with competitive pressures and customer demands have created a need for a time and cost efficient method of producing mold assemblies for use in plastic injection molding. Most of the expense involved in working with mold assemblies occurs during the tooling process of the initial manufacture of the mold. Another expense results from the down-time which inevitably occurs during the repair, maintenance, or changing of the mold assembly.

In a majority of cases, mold assemblies are custom manufactured to certain specifications and then mounted to injection molding machines to produce a specific part or parts. The mold assemblies generally comprise two plates, oppositely positioned, with one plate allowed to move while the other is stationary. Plastic, or other material, is injected into the mold cavity between the plates, producing a plastic molded part. The molded part is then ejected from the mold assembly.

In order to reduce down-time, manufacturers have devised quick-change mold systems which provide mold assemblies that can be rapidly installed or removed from the injection molding machine. Examples of such systems are generally illustrated in U.S. Pat. No. 5,114,330, to Nielson; and U.S. Pat. No. 4,500,274, to Cyriax et al., both of which are incorporated herein by reference.

The Nielson patent generally describes an apparatus consisting of a plate receiving member mounted on a movable platen of the injection molding machine and a second plate receiving member mounted to one side and in alignment with the first member. A sliding frame plate, to carry one side of the injection molding machine and one set of mold modules, is then attached to the two plate receiving members to allow for a sliding action. The two mold halves are thus, in a relatively short amount of time, attached to the injection molding machine or removed therefrom minimizing the downtime of the machine.

The Cyriax patent employs clamping members rather than a sliding frame plate as used in the Nielson patent. These clamping members then connect or disconnect the plate receiving members with the injection molding machine which, again, allows for a relatively rapid replacement of the mold halves.

Although these systems provide a means for rapidly changing the mold assemblies on injection molding machines, these systems do not solve the problems associated with the expense of the initial manufacturing the mold assembly. Whenever a modification to the mold is desired, retooling of the entire mold assembly is still required. Another disadvantage of these systems is that they do not have the versatility to allow for different parts to be manufactured using the same mold assembly.

To address the problem associated with the time and expense of the initial manufacturing of mold assemblies, some mold manufacturers have chosen to use interchangeable base plates which accommodate different types of mold designs. Examples of such systems are generally illustrated in U.S. Pat. No. 4,795,125, to Boros et al. and the mold assemblies currently used by Master Unit Die Products, Inc. ("MUD"), incorporated herein by reference.

The Boros patent generally describes a method of manufacturing plastics or other materials comprising a mold assembled from repetitive modular standard elements consisting of substantially ready-to-use interchangeable base plates which carry the individually shaped (negative) mold or die cavity surface for forming the particular article to be manufactured. A similar method for manufacturing plastics and other similar type materials is currently employed by MUD. These interchangeable base plate systems allow for a larger number of applications by changing the various inserts within the system. This, in turn, reduces the potential costs involved in changing the mold assemblies for the particular applications.

One major disadvantage of the type of system described by Boros and employed by MUD is that the base plates must still be entirely exchanged. To accomplish this, the entire plate must be removed and re-installed with another in order to accommodate a different application. This process requires a substantial amount of time and effort.

Another disadvantage of this type of system is that it fails to address the problem of making various alterations and modifications, even minor ones, to the molded part once the mold assembly has already been manufactured. The current practice is to retool and manufacture a completely new plate to accommodate such a change, which is a time consuming and expensive process.

Advance Mold and Manufacturing, Inc. ("Advance Mold") has chosen to standardize certain frequently used injection molding frame elements and keep them in inventory in order to save the time and expense involved in manufacturing each part of the mold assembly on an individual basis. The standardized frame elements are then custom machined to the part specifications. By pre-fabricating frequently used frame elements and then stockpiling them in inventory, Advance Mold is able to reduce the downtime of the press inherent in the manufacturing process.

One major disadvantage to using the type of system employed by Advance Mold is that the initial time and expense of manufacturing a stock pile of standard frame parts is not reduced. Furthermore, it is still necessary to machine each frame element for the particular application. Another disadvantage to Advance Mold's system is that it does not allow for flexibility in adopting mold assemblies which are not in the current inventory. The frame elements to accomplish this must still be manufactured from scratch. Still another disadvantage to this type of system is that a substantial amount of time and effort is needed to change the frame elements in switching from one application to another.

One possible solution to these problems is to provide a single mold assembly which is universal and modular to reduce the initial manufacturing expense and to avoid the need for stockpiling multiple standardized assemblies.

Another possible solution to these problems is to provide a mold assembly which is universally modular in nature to accommodate the making of different molded products without the need for retooling or manufacturing of the entire mold assembly.

Another possible solution to these problems is to provide a mold assembly which could readily accommodate changes or modifications to a part design without the need for manufacturing an entirely new mold assembly.

Another possible solution to these problems is to provide a mold assembly with modular parts which can be quickly and efficiently changed to a new application thereby increasing productivity by reducing press downtime.

Thus, there has been a need in the art for single mold assembly which is universal and modular to reduce the initial manufacturing expense and to avoid the need for stockpiling standardized assemblies.

There is an additional need in the art for single mold assembly and which is universally modular in nature which accommodates the making of different molded products and allows changes or modifications to a part design without the need for retooling or manufacturing of the entire mold assembly.

There is an additional need in the art for a mold assembly with modular parts which can be quickly and efficiently changed to accommodate new applications.

SUMMARY OF THE INVENTION

The present invention solves significant problems in the art by providing a modular mold for use in injection molding which accommodates the making of different molded products and allows changes or modifications to a part design without the need for retooling or manufacturing of the entire mold assembly.

Generally described, the present invention provides a mold assembly for an injection molding press comprising a plurality of sections which when pressed together form a mold cavity; and a plurality of interchangeable modules attached to the mold assembly for shaping a plurality of sides of a component.

In a preferred embodiment of the invention, the interchangeable modules, attached to the mold assembly for shaping a plurality of sides of a component, comprise plurality of slide modules attached to the mold assembly by a plurality of slide retainers attached along an interior surface of the plurality of sections, wherein each of the slide modules includes an insert attached thereto, the insert provides a negative mold surface within the mold cavity for shaping the component. A plurality of slide actuators are attached to the plurality of sections opposite the slide modules for engaging the slide modules, wherein the slide actuators move the slide modules in a direction for shaping the plurality of sides of the component when the plurality of sections are pressed together forming the mold cavity, and wherein the slide actuators move the slide modules in a direction away from the component when the plurality of sections are separated.

In an alternate embodiment, at least one of the plurality of slide modules is replaced with a blank module, the blank module remains in a fixed position when the plurality of sections are pressed together and when the plurality of sections are separated.

The mold further comprises means for injecting a molding material into the mold cavity for forming the component and an ejector means for ejecting the component when the molding material has set.

Accordingly, it is an object of the present invention to provide a mold assembly for an injection molding press which comprises a plurality of sections and a plurality of interchangeable modules within the cavity of a mold to allow for variations in shaping sides of components.

It is another object of the present invention to provide a plurality of blank modules and a plurality of slide modules as the interchangeable modules, wherein each of the slide modules includes an insert attached thereto to provide a negative mold surface within the mold cavity for shaping the component.

Accordingly, it is a feature of the invention to provide a plurality of slide actuators attached to the fixed side for engaging the slide modules, wherein the slide actuators move the slide modules inward when the mold sections are pressed together forming a mold cavity and move the slide modules outward when the mold sections are separated.

It is another feature of the invention to provide a plurality of blank modules which remain in a fixed position when the mold sections are pressed together, wherein the blank and slide modules are interchangeable as needed.

An advantage of the invention is that the interchangeable modules reduce the initial manufacturing expense and avoid the need for stockpiling standardized assemblies, since changes to a component can be completed by merely interchanging certain of the modules, without the need for retooling or manufacturing of the entire mold assembly.

Another advantage of the invention is that the interchangeable modules, whether blanks or slide modules, can be quickly and efficiently changed to accommodate new applications.

These and other objects, features, and advantages of the present invention may be more clearly understood and appreciated from a review of the following detailed description of the disclosed embodiments and by reference to the appended drawings and claims.

DETAILED DESCRIPTION OF THE PREFERRED EMBODIMENT

Figure 1:
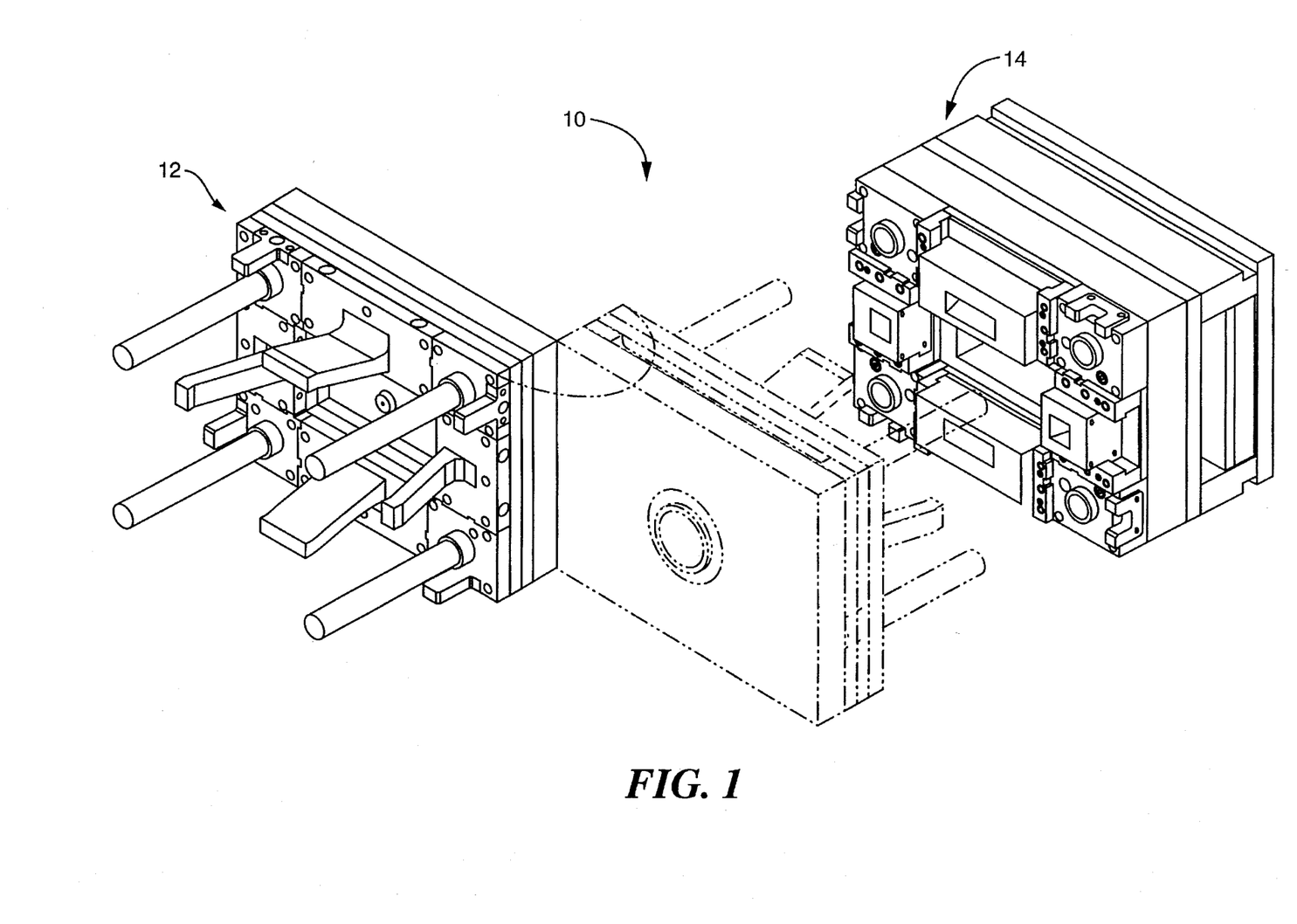
FIG. 1 is a perspective view of a preferred embodiment of the mold showing the ejector side and the fixed side assemblies partially separated to show the interior of the mold halves according to the invention.

Referring initially to FIG. 1 of the drawings, in which like numerals indicate like elements throughout the several views, in a preferred embodiment the mold assembly of this invention is generally illustrated by reference numeral 10. The mold assembly 10 generally comprises a plurality of sections, generally a fixed side 12 and an ejector side 14, which when pressed together by an injection mold press form an inner cavity in which plastic is injected to form a molded component 100.

Figure 2:
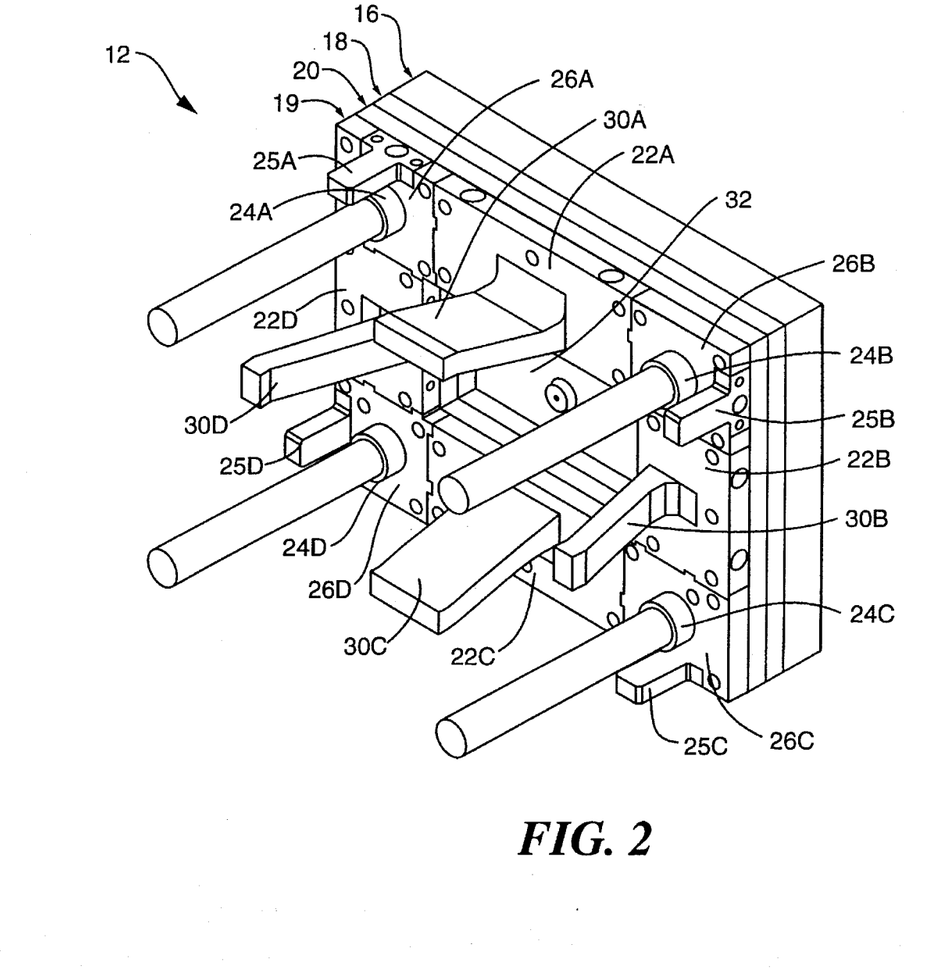
FIG. 2 is a perspective view of a preferred embodiment of the mold showing the fixed side only.

In a preferred embodiment, each side 12, 14 comprises a series of layered plates. The fixed side assembly 12, FIG. 2, comprises a top clamp plate 16 for mounting to the mold press attached to a runner stripper plate 18, a support plate 20, and then an actuator plate assembly 19. The actuator plate assembly 19 comprises slide actuator plates 22a–d positioned along the sides and four corner posts 26a–d located in each corner. Each slide actuator plate 22a–d includes perpendicularly attached slide actuator 30a–d. Each corner post 26a–d includes a leader pin hole 24a–d. The corner posts 26a–d each include an alignment bar 25a–d. The center of the fixed side assembly 12 comprises an opening 32 for the fixed side inserts.

Figure 3:
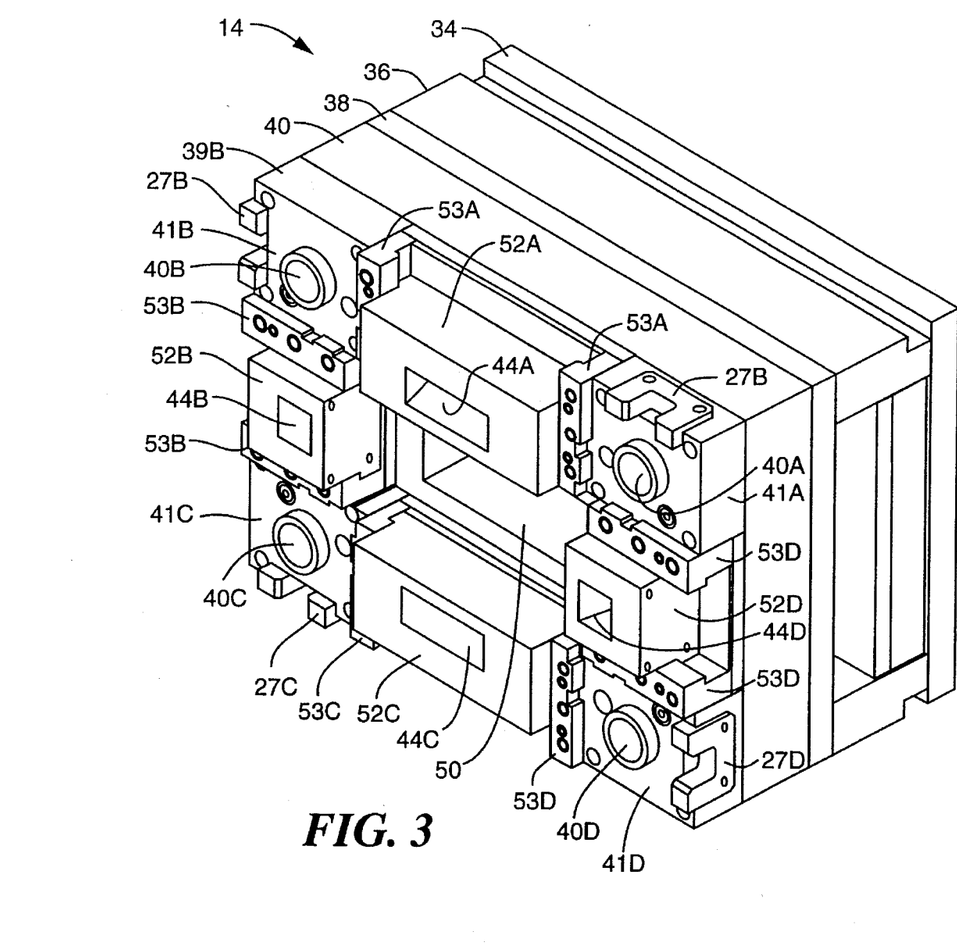
FIG. 3 is a perspective view of a preferred embodiment of the mold showing the ejector side only.
Figure 4:
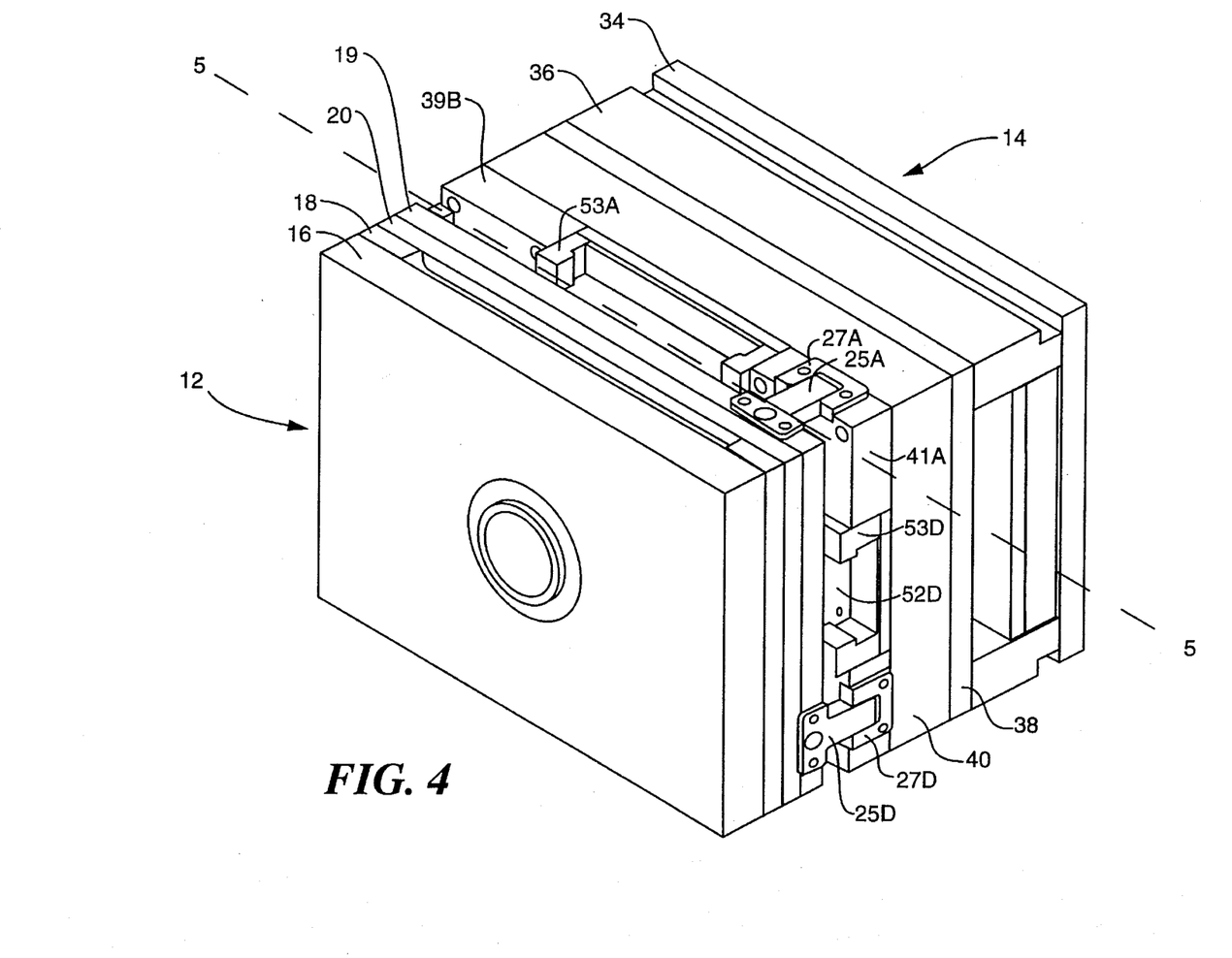
FIG. 4 is a perspective view of a preferred embodiment of the mold showing the ejector side and the fixed side assemblies fitted together (closed position) according to the invention.

The ejector side 14, FIG. 3, comprises an ejector clamp plate 34 for mounting to the mold press attached to an ejector plate 36, a back-up support plate 38, a support plate 40 and then a slide plate assembly 39. The slide plate assembly 39 comprises preferably up to four slide modules 52a–d held in place by slide retainers 53a–d. The slide modules 52a–d and slide retainers 53a–d are removable and can be replaced with blank modules 54a–d depending on the particular application. See FIG. 7. The blank modules 54a–d would remain in a fixed location when the mold assembly is pressed together. The blank modules 54a–d could have a flat surface forming a flat surface on the component, a shaped negative surface forming the positive shape on the component, or a mold insert attached thereto for forming the component.

The slide plate assembly 39 also comprises four corner posts 41a–d. Each corner post includes a leader pin hole 40a–d. The corner posts 41a–d each include an alignment bar slot 27a–d. The center of the ejector side assembly 14 comprises an opening 50 for the ejector side mold inserts. Actuator holes 44a–d contained within the vertical slide modules 52a–d are aligned to receive the slide actuators 30a–d from the fixed side assembly 12.

Figure 5:
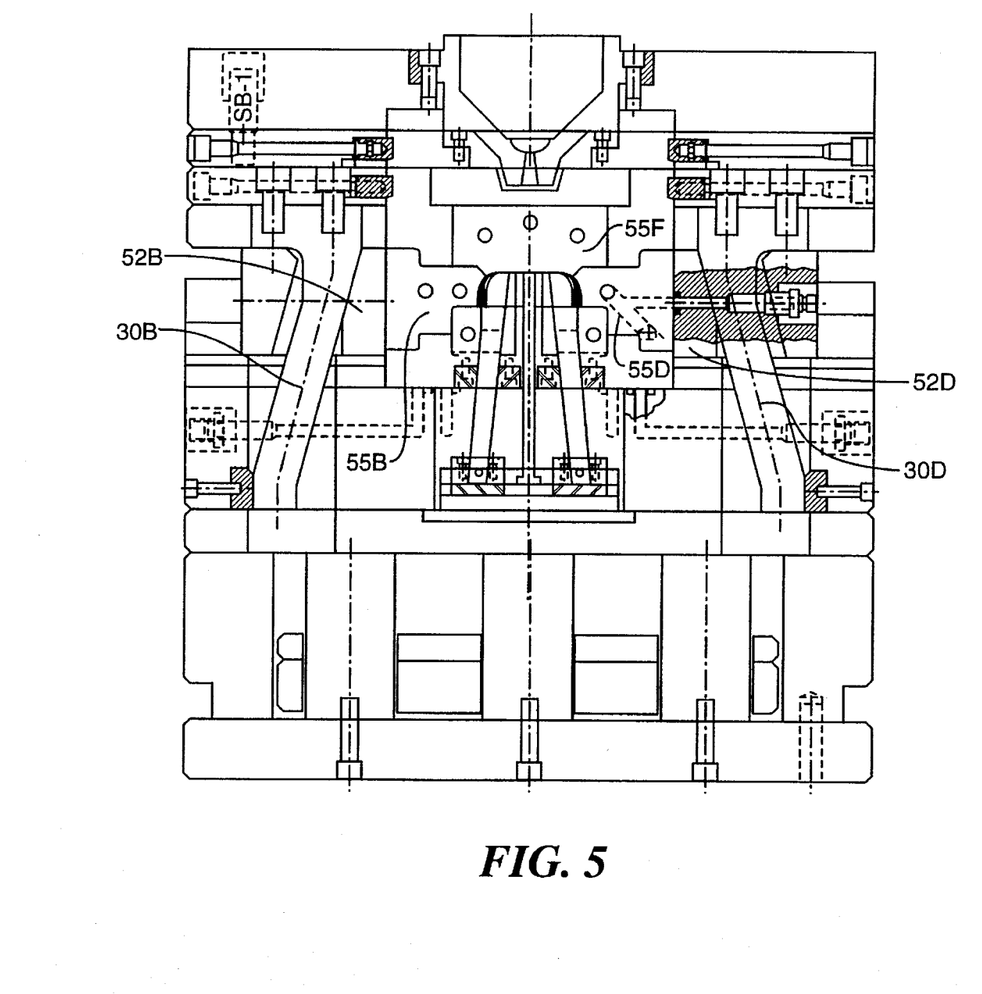
FIG. 5 is a cross sectional view through the mold assembly taken along lines 5—5 of FIG. 4 showing the ejector side and the fixed side assemblies fitted together and having cavity inserts in place forming a component part.
Figure 6:
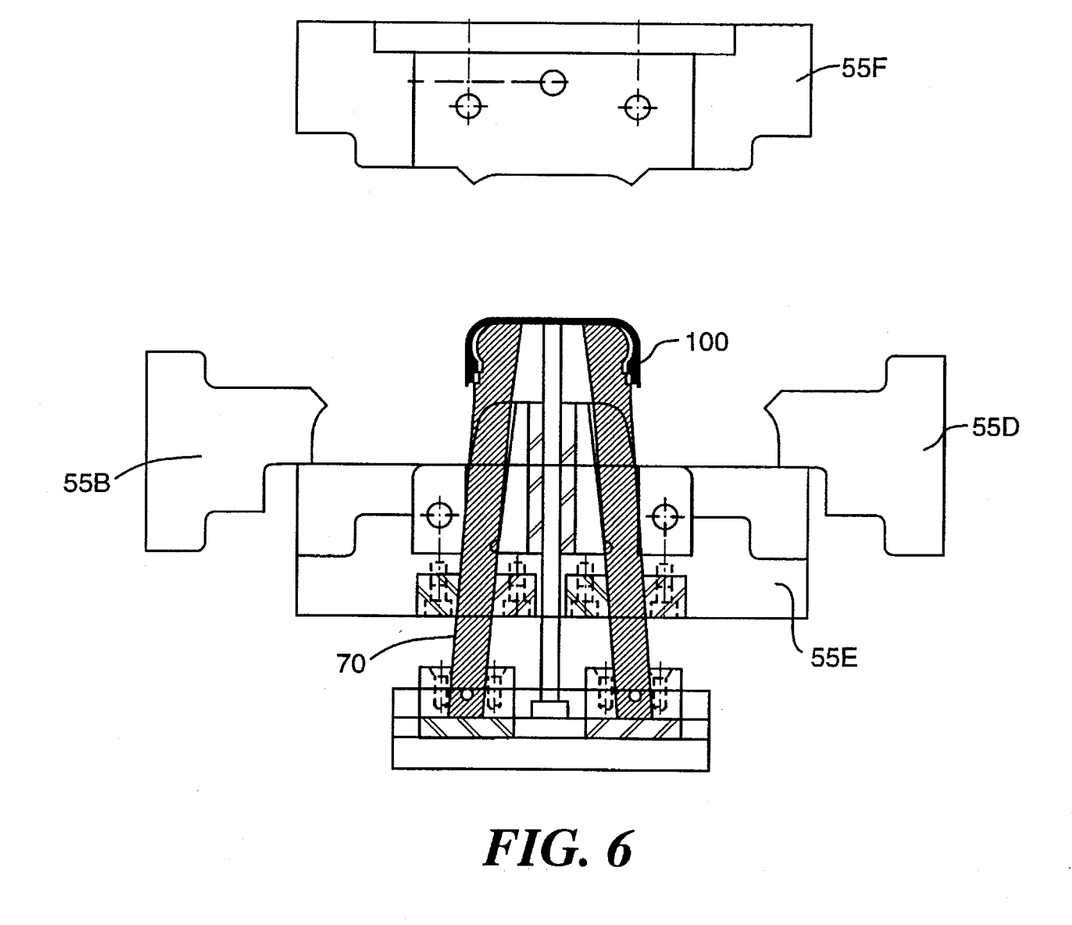
FIG. 6 is a partial cross sectional view through the mold assembly taken along lines 5—5 of FIG. 4 after separation of the mold halves showing the cavity inserts pulled away from the component.

Turning now to FIGS. 5–6, in order to manufacture a specific component, mold inserts 55b,d,e,f (55a, c not shown) which carry the individually shaped negative mold cavity surface for forming the component are mounted within the openings 32, 50 and to the slide modules 52a–d of the mold halves 12, 14. The formed component would represent the positive, or opposite, of the negative mold cavity surface. For a three-dimensional component, the mold inserts 55e, 55f which are mounted within the openings 32, 50 shape the top and bottom of the component, while the mold inserts 55a–d mounted to the slide modules 52a–d of the ejector side assembly 39 shape the four sides of the component. The mold halves 12, 14 are then attached to the respective heads (not shown) of an injection mold press by means of the clamping plates 34.

FIGS. 5–6 show the mold inserts 55b, 55d, 55e, 55f used in forming a molded component 100. Generally, the opening 50 in the ejector side half 14 is fitted with an insert 55e. The fixed side half 12 is fitted with an insert 55f in the opening 32. In order to shape the molded component 100, inserts are also attached to the four slide modules 52a–d. The fixed side half 12 is then brought together with the ejector side half 14 and the injection process takes place producing the molded component 100.

Specifically, in the embodiment shown in FIGS. 5–6, the invention is adapted to be used for molding a U-shaped plastic component 100. The cavity for the component 100 is defined by inserts 55a–f. The inserts 55a–f include a fixed side cavity insert 55f held in place by side locks in the fixed mold half 12, an ejector side core insert 55e held in place by screws to the ejector mold half 14, and side pull core inserts 55b, 55d held in place by screws to the horizontal slide modules 52b, 52d. The remaining two side pull core inserts 55a, 55c, not shown, are held in place by screws to the horizontal slide modules 52a, 52c. A lifter bar insert 70 is used to mold the undercut of the component 100.

The preferred material in which the inserts 55a–f and the lifter bar insert 70 are made is steel.

With the above understanding of the elements and arrangement of the mold cavity inserts 55a–f, the structure and operation of the mold assembly shown in FIG. 5–6 can be readily understood. The fixed side cavity insert 55f is held in place by side locks in the fixed mold half 12. The ejector side core insert 55e is held in place by screws to the ejector mold half 14.

Each side pull core insert 55a–d is held in place by screws to the horizontal slide modules 52a–d. Each horizontal slide module 52a–d has an opening 51a–d through which a slide actuator 30a–d passes. In operation, when the mold opens the slide modules 52a–d slide along the surfaces of the slide actuators 30a–d to pull the side pull core inserts 55a–d outwardly.

Generally, when the mold halves 12, 14 are pressed together, they are aligned by means of component parts which are familiar to those skilled in the art. In this particular embodiment, the two mold halves 12 and 14 are aligned with leader pins 61a–d fittedly inserted in one end into leader pin holes 24a–d of the fixed side 12 and the other end into leader pin holes 40a–d of the ejector side 14. The mold halves are further aligned by alignment bars 25a–d fittedly inserted into their respective alignment slots 27a–d.

On closing the mold, travel of the ejector side 14 carries the plates 34, 35, 38, and 40 and alignment bars and slots to the point where the alignment bars and slots contact the alignment bars and slots of the fixed side 12. The leader pins of the fixed side 12 are inserted into the leader pin holes 40a–d of the ejector side 14. At this point, the actuator plate assembly 19 of the fixed side 12 contacts the slide plate assembly 39 of the ejector side 14.

The slide actuators 30a–d are mounted to the actuator plate assembly 19 of the fixed side 12. The horizontal slide modules 52a–d of the ejector side 14 have openings 51a–d through which the slide actuators 30a–d pass and cause the slide modules to slide. In operation, when the mold closes the openings 51a–d of the slide modules 52a–d slide along the surfaces of the slide actuators 30a–d to move the side pull core inserts 55a–d inwardly. If blank modules are substituted for any of the slide modules, the blank modules remain in a fixed position despite the movement of the slide actuators because the blank modules have larger openings through which the slide actuators pass without causing the blank modules to move.

In an alternate embodiment, hydraulic cylinders or the like may be used to move the slide modules to form a mold cavity and then pull away from the component when made. This would allow for removal of the component without separating the halves.

Plastic, or other suitable material, is subsequently injected into the mold cavity through a distributing channel, not shown. After a sufficient time is allowed for setting of the molded component, the fixed side assembly 12 and the ejector side assembly 14 separate Along the parting line.

Upon completion of the separation of the two halves 12, 14, the molded component 100 is removed from the inner mold cavity surface. In a preferred embodiment, an ejector pin 72 extends up from the ejector plate assembly so that as the ejector plate assembly is retracted, the pin 72 remains in position to separate the molded component 100 from the mold inserts 55a–f. The ejector pin 72 is then retracted and the component 100 is ejected. Another removal means comprises a stripper (not shown) which pulls the core away from the component.

In order to produce either an entirely new molded product or modify an existing one, different inserts are attached to the slide modules 52a–d and within the openings 32, 50. If only one side of an existing product needs to be modified, the appropriate slide module is simply fitted with a different insert. This purpose can be accomplished on virtually any planar surface of the product.

Figure 7:
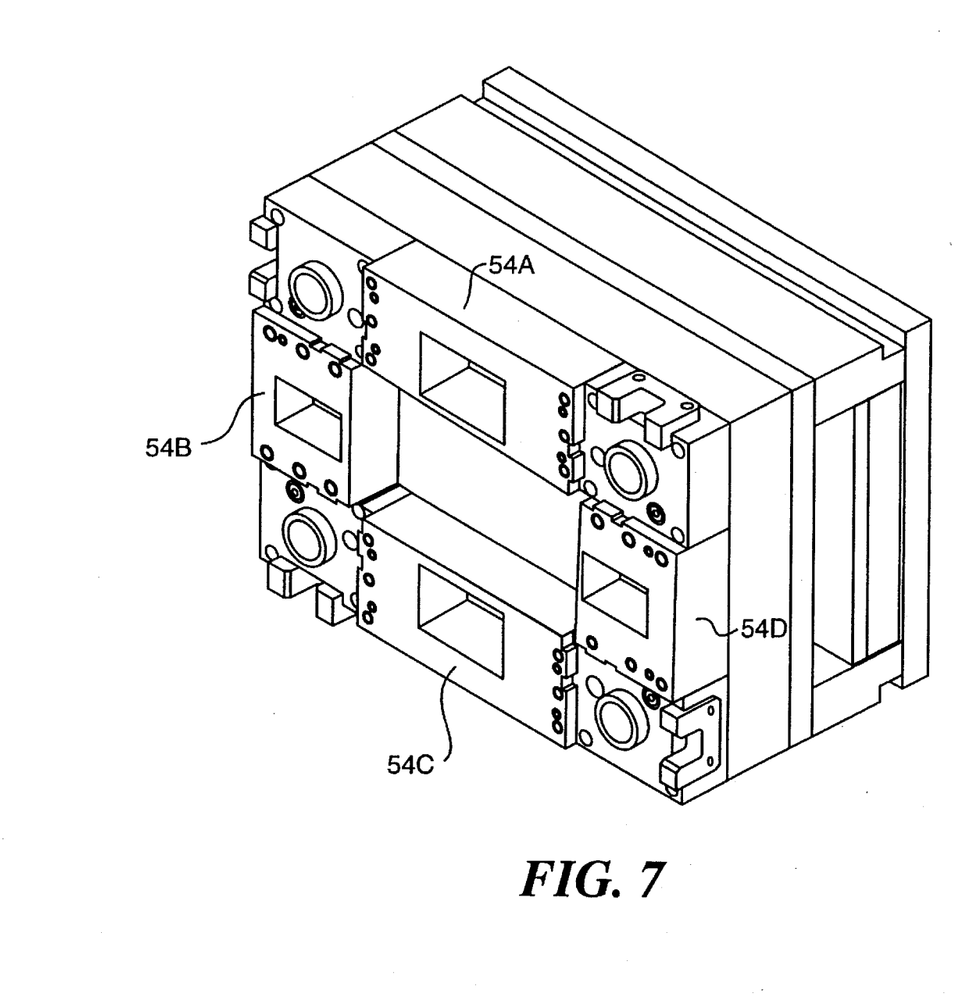
FIG. 7 is a perspective view of a preferred embodiment of the mold showing blanks in place of certain of the slide modules.

Similarly, as shown in FIG. 7, a number of blanks 54a–d may be inserted in the place of the appropriate slide modules 52a–d. The blank modules 54a–d would remain in a fixed location when the mold assembly is pressed together. The blank modules 54a–d could have a flat surface forming a flat surface on the component, a shaped negative surface forming the positive shape on the component, or a mold insert attached thereto for forming the component. For example, if a specific part is manufactured without the need for any cutting on two of its sides, the appropriate blanks 54b, 54d are used in lieu of slide modules 52b, 52d and the slide retainers 53b, 53d on either side thereof. Then, if the manufacturer wants to add a cutting into one of the sides where a blank is located, the blank is replaced by the appropriate slide module and retainer with its insert attached. In this way, many products can be produced or modified with a minimum of cost, effort and time, since the entire mold half does not need to be remanufactured and replaced.

Accordingly, it will be understood that the preferred embodiment of the present invention has been disclosed by way of example and that other modifications and alterations may occur to those skilled in the art without departing from the scope and spirit of the appended claims.

What is claimed is:

1. A modular mold for use in injection molding comprising:

a mold assembly for an injection molding press comprising a plurality of sections which when pressed together form a mold cavity; and a plurality of interchangeable modules attached to said mold assembly for shaping a plurality of sides of a component.

2. The mold of claim 1, wherein said plurality of modules comprise plurality of slide modules.

3. The mold of claim 2, wherein said slide modules are attached to said mold assembly by a plurality of slide retainers attached along an interior surface of said plurality of sections.

4. The mold of claim 3, further comprising a plurality of slide actuators attached to said plurality of sections opposite said slide modules for engaging said slide modules, wherein said slide actuators move said slide modules in a direction for shaping said plurality of sides of said component when said plurality of sections are pressed together forming said mold cavity, and wherein said slide actuators move said slide modules in a direction away from said component when said plurality of sections are separated.

5. The mold of claim 4, wherein each of said slide modules includes an insert attached thereto, said insert provides a negative mold surface within said mold cavity for shaping said component.

6. The mold of claim 5, wherein at least one of said plurality of slide modules is replaced with a blank module, said blank module remains in a fixed position when said plurality of sections are pressed together and when said plurality of sections are separated.

7. The mold of claim 6, further comprising means for injecting a molding material into said mold cavity for forming said component.

8. The mold of claim 7, further comprising a removal means for removing said component when said molding material has set.

9. A modular mold for use in injection molding comprising:

a mold assembly for an injection molding press comprising a plurality of sections which when pressed together form a mold cavity; and a plurality of interchangeable modules attached to said mold assembly for shaping a plurality of sides of a component, wherein said plurality of modules comprise plurality of slide modules attached to said mold assembly by a plurality of slide retainers attached along an interior surface of said plurality of sections, wherein each of said slide modules includes an insert attached thereto, said insert provides a negative mold surface within said mold cavity for shaping said component; and a plurality of slide actuators attached to said plurality of sections opposite said slide modules for engaging said slide modules, wherein said slide actuators move said slide modules in a direction for shaping said plurality of sides of said component when said plurality of sections are pressed together forming said mold cavity, and wherein said slide actuators move said slide modules in a direction away from said component when said plurality of sections are separated.

10. The mold of claim 9, wherein at least one of said plurality of slide modules is replaced with a blank module, said blank module remains in a fixed position when said plurality of sections are pressed together and when said plurality of sections are separated.

11. The mold of claim 10, further comprising means for injecting a molding material into said mold cavity for forming said component.

12. The mold of claim 11, further comprising a removal means for removing said component when said molding material has set.

* * * * *